United States Patent
Jonsson et al.

(10) Patent No.: US 7,962,653 B2
(45) Date of Patent: Jun. 14, 2011

(54) METHODS FOR INCREASED TOLERANCE AGAINST PACKET REORDERING FOR THE SECURE REFERENCE PRINCIPLE IN ROBUST HEADER COMPRESSION

(75) Inventors: Lars-Erik Jonsson, Lulea (SE); Ghyslain Pelletier, Boden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1126 days.

(21) Appl. No.: 11/568,944

(22) PCT Filed: Feb. 8, 2005

(86) PCT No.: PCT/SE2005/000158
§ 371 (c)(1), (2), (4) Date: Nov. 10, 2006

(87) PCT Pub. No.: WO2005/114948
PCT Pub. Date: Dec. 1, 2005

(65) Prior Publication Data
US 2007/0274317 A1    Nov. 29, 2007

(30) Foreign Application Priority Data
May 24, 2004 (SE) ..................... 0401346

(51) Int. Cl.
*G06F 15/16* (2006.01)
*H04J 3/00* (2006.01)
(52) U.S. Cl. .................. 709/247; 709/246; 370/521
(58) Field of Classification Search .......... None
See application file for complete search history.

(56) References Cited

U.S. PATENT DOCUMENTS

| | | | | |
|---|---|---|---|---|
| 6,882,637 | B1* | 4/2005 | Le et al. | 709/247 |
| 7,290,063 | B2* | 10/2007 | Kalliokulju et al. | 709/247 |
| 2001/0048680 | A1* | 12/2001 | Yoshimura et al. | 370/389 |
| 2002/0026620 | A1* | 2/2002 | Johansson et al. | 714/807 |
| 2002/0142730 | A1 | 10/2002 | Hsu | |
| 2003/0198250 | A1* | 10/2003 | Hakenberg et al. | 370/457 |
| 2004/0034717 | A1* | 2/2004 | Pelletier et al. | 709/246 |
| 2004/0039830 | A1 | 2/2004 | Zhang | |
| 2004/0073711 | A1 | 4/2004 | Pelletier | |
| 2004/0088642 | A1* | 5/2004 | Imura et al. | 714/776 |
| 2005/0160184 | A1* | 7/2005 | Walsh et al. | 709/247 |

(Continued)

FOREIGN PATENT DOCUMENTS

EP    1353481 A2    10/2003

(Continued)

OTHER PUBLICATIONS

Bormann et al., Robust Header Compression (ROHC), Jul. 2001, Network Working Group, RFC 3095, pp. 1-168.*

(Continued)

*Primary Examiner* — Hassan Phillips

(57) ABSTRACT

A method for improving the use of a secure reference principle in a header compression scheme over a channel that admits reordering of packets between a compressor and a decompressor includes transmitting a first plurality of non-context updating packets between a compressor and a decompressor over the channel and, in response to a context update, transmitting a second plurality of context-updating packets between the compressor and the decompressor over the channel. The number of packets in the second plurality is greater than or equal to a maximum possible reordering that packets can experience on the channel between the compressor and the decompressor.

20 Claims, 3 Drawing Sheets

U.S. PATENT DOCUMENTS

2006/0187846 A1* 8/2006 Pelletier et al. ............... 370/252

FOREIGN PATENT DOCUMENTS

TW 588554 5/2004

OTHER PUBLICATIONS

Jacobsen V.: "Compressing TCP/IP Headers for Low-Speed Serial Links" RFC 1144, Network Working Group, Feb. 1990.

Degermark, M. et al: "IP Header Compression" RFC 2507 Network Working Group, Feb. 1999.

Casner S. et al: "Compressing IP/UDP/RTP Headers for Low-Speed Serial Links" RFC 2508 Network Working Group, Feb. 1999.

Bormann C. et al: "Robust Header Compression (ROHC): Framework and Four Profiles: RTP, UDP, ESP and Uncompressed" RFC 3095 Network Working Group, Jul. 2001.

Effnet AB, White Paper: The concept of robust header compression, ROCH, Feb. 2004.

* cited by examiner

Related Art

Related Art

METHODS FOR INCREASED TOLERANCE AGAINST PACKET REORDERING FOR THE SECURE REFERENCE PRINCIPLE IN ROBUST HEADER COMPRESSION

The present invention relates to a header compression method which uses a secure reference principle over channels that can reordering packets between a compressor and a decompressor without the risk of generating erroneously decompressed packets.

BACKGROUND

Due to the tremendous success of the Internet, it has become a challenging task to make use of the Internet Protocol (IP) over all kinds of links. However, because of the fact that the headers of the IP protocols are rather large, it is not always a simple task to make this come true for narrow band links, for example cellular links. As an example, consider ordinary speech data transported by the protocols (IP, UDP, RTP) used for Voice-over-IP (VoIP), where the header may represent about 70% of the packet resulting in a very inefficient usage of the link.

The term header compression (HC) comprises the art of minimizing the necessary bandwidth for information carried in headers on a per-hop basis over point-to-point links. The techniques in general have a more than ten-year-old history within the Internet community; several commonly used protocols exist such as RFC 1144, RFC 2507 and RFC 2508. Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is thus an important component to make IP services over wireless, such as voice and video services, economically feasible. Header compression solutions have been developed by the Robust Header Compression (ROHC) Working Group of the IETF to improve the efficiency of such services.

When header compression is used over reordering links, such as IP tunnels or other multi-hop virtual circuits, the reordering of packets can generally impact a header compression algorithm in at least three different ways:
1) the compressor and decompressor contexts can get out of synchronization;
2) packets can be erroneously decompressed by the decompressor (detected);
3) packets can be erroneously decompressed by the decompressor (undetected).

One problem addressed by invention is that the secure reference principle is not robust when reordering of packets occurs between compressor and decompressor. In particular, the usage of the secure reference principle over links that can reorder packets may lead to packets being erroneously decompressed and then forwarded to upper layers (point 3 above).

Note that this does not occur with the optimistic approach because redundant information (e.g. a checksum) to prevent decompression errors is used in all packets, and faulty decompression due to reordering can thus be detected by the decompressor. Erroneous packets can then be discarded instead of being forwarded to upper layers.

SUMMARY OF THE INVENTION

According to a one aspect of the present invention is provided a header compression method which uses a secure reference principle over channels that can reordering packets between a compressor and a decompressor without the risk of generating erroneously decompressed packets.
  said method adapting the robustness properties of said secure reference principle and, the characteristics of said reordering.
  in that erroneous decompression caused by reordering detects by using the transport layer checksum when said secure reference principle are enabled.
  in that the transport layer checksum verification are applied to a number of non context-updating packets at least equal to the maximum possible reordering after it has updated its context and send the corresponding acknowledgement.
  in that erroneous decompression caused by said reordering may be avoided by delays acknowledgements for context updates, with the purpose of forcing said compressor into sending packets that are less sensitive to reordering (for which erroneous decompression can be detected), until it has good confidence that the channel between said compressor and said decompressor is purged of any packet types for which said reordering can cause erroneous decompression.
  in that achieve this confidence by using a delay (in sequence or in time) at least equal to the maximum possible of said reordering that can occur on the channel between said compressor and said decompressor.
  in that said decompressor uses the self-regulating properties of the LSB and W-LSB encoding methods to determine when to update the secure reference.
  in that said compressor only sends context-updating packets, even when other (more efficient) packet types may be sent and that said decompressor perform selective context updating and send corresponding acknowledgements based on particular semantics of a specific subset of context-updating packet types.
  in that said compressor, when an update to the context is performed, sends a number X of consecutive context-updating packets at least equal to the maximum possible reordering that can occur on the channel between said compressor and said decompressor and that said decompressor updates its context and send corresponding acknowledgement only for the first context updating packet received in a sequence, or ensures that the packet acknowledged was followed by X context-updating packets.
  in that said compressor and/or said decompressor are/is implemented according to [ROHC], [IP-ONLY], [ROHC-UDPLite].

According to a second aspect of the present invention is provided a node in a communication network which uses a header compression method for minimizing the necessary bandwidth for information carried in headers when a secure reference principle are applied over channels that can reordering packets between a compressor and a decompressor without the risk of generating erroneously decompressed packets.
  in that that the said method adapting the robustness properties of said secure reference principle and, the characteristics of said reordering.

The proposed invention allows a header compression algorithm using the secure reference principle to be used over channels that can reorder packets between compressor and decompressor without the risk of generating erroneously decompressed packets. This is made possible from adapting the robustness properties of the secure reference principle to take into account the characteristics of reordering.

The robustness of the header compression algorithm using the secure reference principle (in bidirectional header compression) is dependent on the cumulative effect of the context updates. The modifications of the invention ensure that reordering cannot affect decompression based on a secure reference. These ideas are particularly useful for systems where ROHC operating in R-mode is used.

This is particularly applicable to most ROHC profiles, including—but not limited to—the ROHC RTP (0x0001), UDP (0x0002), IP (0x0004), ESP (0x0003), UDP-Lite (0x0008), RTP/UDP-Lite (0x0007) header compression profiles. Some of the proposed solutions also have the advantage of not requiring any change to any of the ROHC standards.

BRIEF DESCRIPTION OF THE DRAWINGS

Embodiments of the invention will now be described, by way of example, with reference to the accompanying drawings, in which.

DETAILED DESCRIPTION OF PARTICULAR EMBODIMENTS

Figure 1:
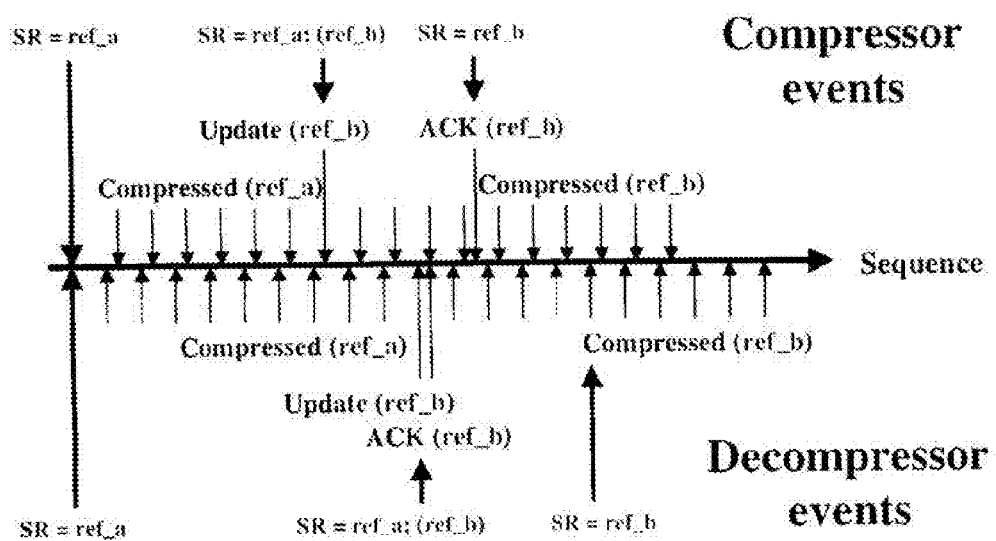
FIG. 1 illustrates the updating of the Secure Reference (SR), in-order delivery.

A glossary of the abbreviations used in this patent specification is set out below to facilitate an understanding of the present invention.

| | |
|---|---|
| ROHC | Robust Header Compression |
| U-mode | unidirectional mode |
| FC | Full Context |
| VoIP | Voice-over-IP |

The first part of the following shall briefly describe the relevant features and modes of operation, of header compression, for a better understanding of the invention.

Robust Header Compression (ROHC)

ROHC, as defined in RFC 3095 [ROHC], is an extensible framework for which profiles for compression of various protocols may be defined. For real-time multimedia services (e.g. voice, video), the application data is transported end-to-end within an IP/UDP/RTP stream. Header compression of IP/UDP/RTP is defined by the ROHC profile 0x0001 (ROHC RTP) and is applicable for Voice-over-IP (VOIP) services among others. The ROHC RTP header compression scheme has been designed to efficiently compress the IP/UDP/RTP headers over an arbitrary link layer. Except for negotiation (see also [ROHC-PPP]), ROHC profiles only requires framing and error detection to be provided by the link layer, while all other functionality is handled by the ROHC scheme itself.

In addition to the ROHC RTP profile, a number of other ROHC profiles[1] have also been defined for compression of:
IP/UDP headers and IP/ESP headers [ROHC];
IP only headers [IP-ONLY];
IP/UDP-Lite/RTP headers [ROHC-UDPLite].

Assumption of in-Order Delivery

The header compression profiles defined in RFC 3095 [ROHC] were designed with the assumption that the channel between the compressor and the decompressor will not reorder the header-compressed packets; the channel is required to maintain packet ordering for each compressed flow. This assumption was motivated because the channels initially considered as potential candidates to use ROHC did guarantee in-order delivery of packets; this assumption was useful to improve compression efficiency and the tolerance against packet loss, objectives that were ranked highest on the requirement list at the time. The profile for compression of IP headers only [IP-ONLY] and the profiles for UDP-Lite are essentially extensions to the profiles found in [ROHC]; therefore, these profiles also inherit the same assumption of in-order delivery.

Header Compression Context

A compression context contains and maintains relevant information about past packets, and this information is used to compress and decompress subsequent packets. Taken from [ROHC]:

"The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP Identifier field changes and the typical inter-packet increase in sequence numbers or timestamps."

Header Compression State Machines and Context Synchronization

One can usually realize a header compression scheme (such as a ROHC Profile) as a state machine and the challenging task is to keep the compressor and decompressor states, called contexts, consistent with each other, while keeping the header overhead as low as possible. There is one state machine for the compressor, and one state machine for the decompressor. The compressor state machine directly impacts the level of compression efficiency, as it is an important part of the logic controlling the choice of compressed packet type to be sent; the purpose of the decompressor state machine is mainly to provide the logic for feedback (if applicable) and to identify the packet types for which decompression may be attempted.

Packet Types and Context Updates

A packet that provides the means for the decompressor to verify successful decompression is a context-updating packet. Because decompression can be verified, this type of packet can update the context. For ROHC, context-updating packet types carry a Cyclic Redundancy Code (CRC) within their format; this is a checksum calculated over the original uncompressed header. This CRC is used to verify successful decompression of each packet; when successful, the context can be updated.

A packet that relies on other means to guarantee successful decompression—i.e. a packet format does not provide the means for the decompressor to verify successful decompression, and that only carries the information necessary for the decompression itself, is a self-contained packet. These packets do not update the context.

Modes of Operation

The ROHC profiles defined in RFC 3095, [IP-ONLY] and [ROHC-UDPLite] all support three different modes of operation. In short, for a specific context, the mode controls the actions and the logic to perform as well as the packet types to use during different states of the header compression operation. Packet types and formats that are allowed may vary from one mode to the other. The Unidirectional mode (U-mode) is used at the beginning of any ROHC compression before any transition to other modes may occur. The Bidirectional Optimistic mode (O-mode) aims to maximize the compression efficiency and sparse usage of the feedback channel. The Bidirectional Reliable mode (R-mode) aims to maximize robustness against loss propagation and context damage propagation. Each mode of operation has different properties in terms of compression efficiency, robustness and processing complexity.

In U-mode, packets are sent from compressor to decompressor only; this mode is thus usable over links where a return path from decompressor to compressor is either not desired or not available, and periodical refreshes are used in this mode.

The U-mode is particularly applicable to broadcast or multicast channels.

The O-mode is similar to the U-mode, with the difference that a feedback channel is used to send error recovery requests and (optionally) acknowledgements of significant context updates from the decompressor to compressor.

Note that for most ROHC profiles, the U-mode and the O-mode are often indistinctly referred to using the term U/O-mode. This is because the U-mode and the O-mode have rather similar characteristics, such as an identical set of packets formats for both modes as well as a similar logic to perform context updates. This logic is called the optimistic approach, and provides robustness against packet losses for the context update procedure in U/O-mode. See also [ROHC, section 5.3.1.1.1] for more details.

The R-mode differs significantly from the two other modes. In particular, the R-mode uses a few different packet types only understood and useful in this mode. However, the R-mode differs mainly by making a more extensive usage of the feedback channel and it uses a stricter logic for performing context updates. This logic is based on the secure reference principle, and provides robustness against packet losses for the context update procedure in R-mode. See also [ROHC, section 5.5.1.2] for more details.

Robustness Principles in Robust Header Compression—Optimistic Approach

A header compressor can use the optimistic approach to reduce header overhead when performing context updates. The compressor normally repeats the same update until it is fairly confident that the decompressor has successfully received the information. The number of consecutive packets needed to obtain this confidence is typically open to implementations, and this number is normally related to the packet loss characteristics of the link where header compression is used. All the packet types used with the optimistic approach are context updating.

Robustness Principles in Robust Header Compression—Secure Reference Principle

A header compressor can use the secure reference principle to ensure that context synchronization between compressor and decompressor cannot be lost due to packet losses. The compressor obtains its confidence that the decompressor has successfully updated the context from a context-updating packet based on acknowledgements received by the decompressor. However, most packet types used with the secure reference principle are self-contained and thus not meant to update the context.

Header Compression and Reordering between Compressor and Decompressor

The IETF Audio-Video Transport (AVT) working group (WG) is working on header compression over multiple hops. While header compression is mainly intended to address low-speed links where bandwidth is scarce, saving bandwidth in backbone facilities is also of importance due to the high costs and considerable amount of traffic carried within. Header compression can be applied point-to-point between each node in the backbone network, however this requires that packets be decompressed and recompressed at each node. Processing can be lowered by performing compression between non-adjacent nodes in the backbone network, over a multi-hop path. For example, a multi-hop path can be a Multi-Protocol Label Switched (MPLS) route in the backbone network, or an IP tunnel. A higher packet loss rate and possible reordering of packets characterize such virtual links, spanning over multiple hops. This can result from packets being re-routed, or simply discarded at a node, due to congestion or failure of a node. Requirements for header compression over multiple hops are in [AVT-HC].

Least Significant Bit (LSB) Encoding

The LSB encoding method is used to encode header fields whose values are usually subject to small changes, such as sequence numbers (SN), e.g. the RTP SN or the SN created at the decompressor when compressing protocols that do not have sequence numbering within their header format.

The k least significant bits of the field value are sent instead of the entire field value, where k is a positive integer. When receiving those bits, the decompressor derives the original value using a previously received value v_ref.

This encoding method is guaranteed to give the correct result if both the compressor and decompressor use interpretation intervals in which the original value resides and in which the original value is the only value that has the same lsb bits as those transmitted.

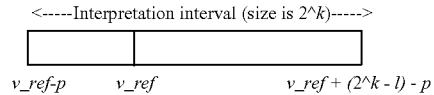

$$\text{<-----Interpretation interval (size is } 2^k\text{)----->}$$

v_ref-p       v_ref                    v_ref + (2^k - 1) - p

The parameter p is used to shift the interpretation interval with respect to v_ref. A derivative encoding method, called Window-LSB encoding, uses a window of candidate v_ref. With the secure reference principle, acknowledgements from the decompressor allow the compressor to remove the values of v_ref that are older than the one acknowledged from the sliding window. LSB and W-LSB are described in [ROHC].

Revisiting Robustness of the Secure Reference Principle

One consequence of the secure reference principle (where not all packets are context updating) is that only the values acknowledged by the decompressor are included as references in the encoding sliding window (e.g. LSB or W-LSB coding). This robustness principle allows compressed packets to be sent with a format[2] that does not include means for the decompressor to verify correct decompression (using e.g. a checksum over the original uncompressed header), as the reception of LSB encoded bits applied to the secure reference is sufficient for correct decompression. Decompression entirely relies on the cumulative effect of previous updates to the secure reference, and the compressed data is based on the current value of the reference—which must be the same for both the compressor and the decompressor. This is suitable when in-order delivery between compressor and decompressor is guaranteed.

However if reordering can occur, the consequence of this robustness principle is that the decompressor does not have the means to verify the decompression of self-contained packets, i.e. not meant to update the secure reference; these packets normally account for the majority of the packets exchanged between compressor and decompressor. As mentioned earlier, some header compression algorithms (e.g. ROHC) may have been designed with the assumption that the channel between compressor and decompressor delivers packets to the decompressor in the same order as when coming out of the compressor. This means that a state-of-the-art compressor will normally select the most optimal packet type based on the characteristics of the header to be compressed and based on the context, not based on the possible reordering characteristics of the link.

In particular, a header compressor operating using the robustness approach of the secure reference principle is expected to use the most optimal (smallest) self-contained packet type (e.g. R-0 for ROHC R-mode) most of the time, which is not meant to update the secure reference and thus for which decompression cannot be verified. Other types of slightly less optimal self-contained packets may also exist (e.g. R-1* for ROHC R-mode).

This means that a state-of-the-art decompressor will not have the capability to handle reordering and detect if a received packet was decompressed based on the wrong reference in the context when applying the secure reference principle. Section 3 describes concepts used by state-of-the-art ROHC implementations.

State of the Art when Using the Secure Reference Principle

FIG. 1 shows a typical example of a compressor (upper part) and a decompressor (lower part) operating using the secure reference principle. Compressed packets are exchanged over time (Sequence axis), and the Secure Reference (SR) LSB sliding window is updated following specific events. Note that the sliding window may contain more than one value at certain moments, but there is always only one that is the secure reference used for compression and decompression of a specific field.

The objective of the compression peers is to always stay synchronized regarding what reference is used for the compression/decompression of a particular packet. In particular, the following applies and is reflected in FIG. 1:

The decompressor can only verify the successful decompression of context-updating packets (packets that can update the secure reference).

The decompressor cannot verify the successful decompression of a self-contained packet (a packet that does not update the secure reference). The decompressor entirely relies on the in-order delivery assumption, which in turns provides the guarantee that self-contained packets are received when the active secure reference is the same reference that was used when compressing the packet.

The compressor updates its sliding window of secure references when an acknowledgement is received from the decompressor. Previous reference(s) (acknowledged and/or unacknowledged) are removed from the window, and only the latest acknowledged one is kept as the secure reference.

The decompressor updates its sliding window of secure references when a packet is received for which the LSBs are less than earlier packets, indicating that it has been compressed with the reference that the decompressor has previously acknowledged. Only the latest reference for which an acknowledgement was sent is then kept as the secure reference.

A header compression algorithm for which the robustness to packet losses is based on the secure reference principle, which is a cumulative principle, is not robust to certain type of reordering. This may lead to some packets being erroneously decompressed and then forwarded to upper layers, back in the network or to the application. This is possible because self-contained packets can be received by the decompressor out-of-order with respect to another packet that updates one or more references of the decompressor state used for the decompression of header fields (e.g. sequence number).

Problems arise when a self-contained packet—a packet that does not provide the means to verify if its decompression was successful—is reordered so that the decompressor receives it after a sequence of packets that in the meantime updated the secure reference. This means that a reordering that delays a self-contained packet so that, in the meantime:

the compressor has received the acknowledgement for a new secure reference;

the compressor has started compressing according to this new reference;

the decompressor has received at least one packet compressed with the new secure reference before the reordered packet is received.

Figure 2:
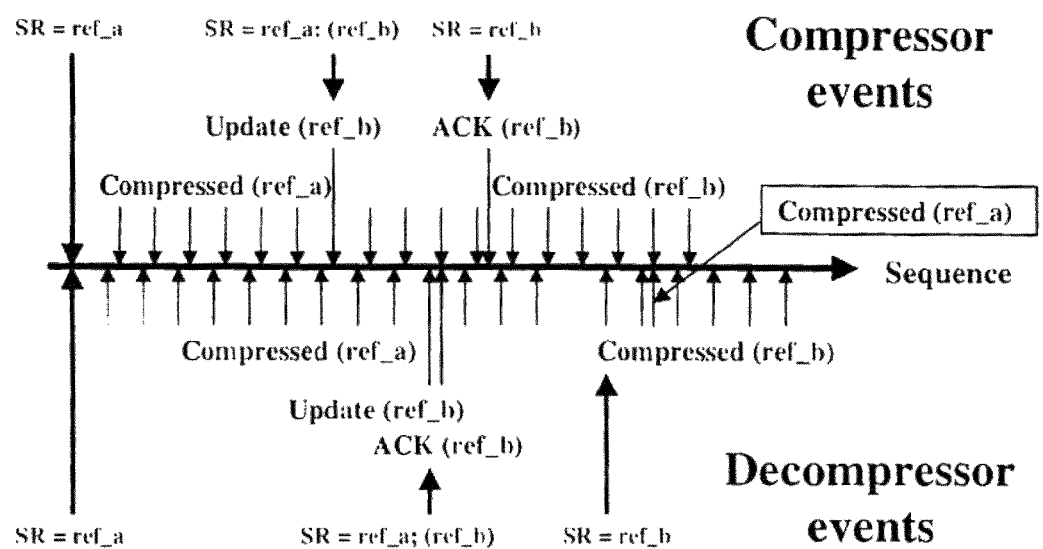
FIG. 2 illustrates the problem with Updating of the Secure Reference (SR), with reordering according to state of the art.

This is shown in FIG. 2.

For example, in the case of a VOIP service where a speech frame is generated at every 20 ms boundary and send individually, in the worst case it can be sufficient that the self-contained header-compressed packet is reordered with one or two adjacent packet(s), leading to a delay due to reordering between as little as 20-40 ms over the channel between compressor and decompressor. In such case, artifacts can occur in the resulting speech rendered to the user; this is because the sequence numbers (and potentially other fields compressed as function of the SN) of the reordered packet are incorrect, and the application cannot detect this error.

To address the problems due to reordering, a compressor could be designed so that only context-updating packets are sent at all times, even when using the secure reference principle. However, this seemingly "straightforward" approach would remove some compression efficiency and robustness to the secure reference principle by generating more frequent context updates, and would force the decompressor into sending a lot of (unnecessary) feedback. This would increase the amount of data exchanged in both the forward and the reverse channel between compressor and decompressor. Modifying existing standards by creating new packet formats could mitigate some of these effects, but this would still in effect defeat the basic ideas behind the secure reference principle.

When applying header compression over channels that may reorder packets, it is therefore desirable to ensure that no packets can be erroneously decompressed and propagated back in the network and to applications. It is thus useful to find a solution to improve the tolerance and robustness of the secure reference principle against reordering, to prevent any disruption or artifacts in the service that could be caused by the header compression algorithm. This should be done while minimizing the overhead introduced by the modifications to the header compression algorithm.

The following describes a number of embodiments of the invention, based on the three different approaches above and based on, but not limited to, the compressor and decompressor behavior of RFC-3095 [ROHC].

Decompressor-Only Logic—Using the Transport Layer Checksum

Basic idea: If the transport layer checksum is used, it can be used by the decompressor as a mean (albeit weak) to detect erroneous decompression due to reordering.

Description: The decompressor can verify that self-contained packets that could be reordered so that they can be decompressed erroneously, i.e. decompressed based on the wrong secure reference, are detected as follow: for a number of self-contained packets equivalent to the estimated maximum possible reordering after a context update (an ACK was sent for the new reference), the decompressor verifies the correctness of the entire decompressed packet using the transport layer checksum.

Note that this does not require any modifications to standards. Note that this is only applicable when the transport layer checksum is enabled, which is not always the case for IPv4.

Decompressor-Only Logic: Delaying Acknowledgements

Basic idea: The decompressor uses the self-regulating properties of the LSB and W-LSB encoding methods to determine when to update the secure reference. The decompressor ensures that it updates its secure reference to a new value only when no self-contained packets compressed using an older secure reference can be received after the first self-contained packet compressed using the updated reference.

Description: After the decompressor receives a packet that can update the secure reference, the decompressor can ensure that the compressor will use the old secure reference until the values to be compressed with this reference are outside the interpretation interval that corresponds to non context-updating packets. In other words, the decompressor can ensure that the compressor is forced to send context updating packets for a number of packets at least equal to the maximum possible reordering on the channel before updating the secure reference with a new value and sending the corresponding acknowledgement to the decompressor.

If the decompressor ensures that the secure reference is not updated until the compressor has sent a number of context-updating packets at least equal to the maximum possible reordering that packets on the channel between compressor and decompressor can experience, then no erroneous decompression due to reordering can occur undetected.

Figure 3:
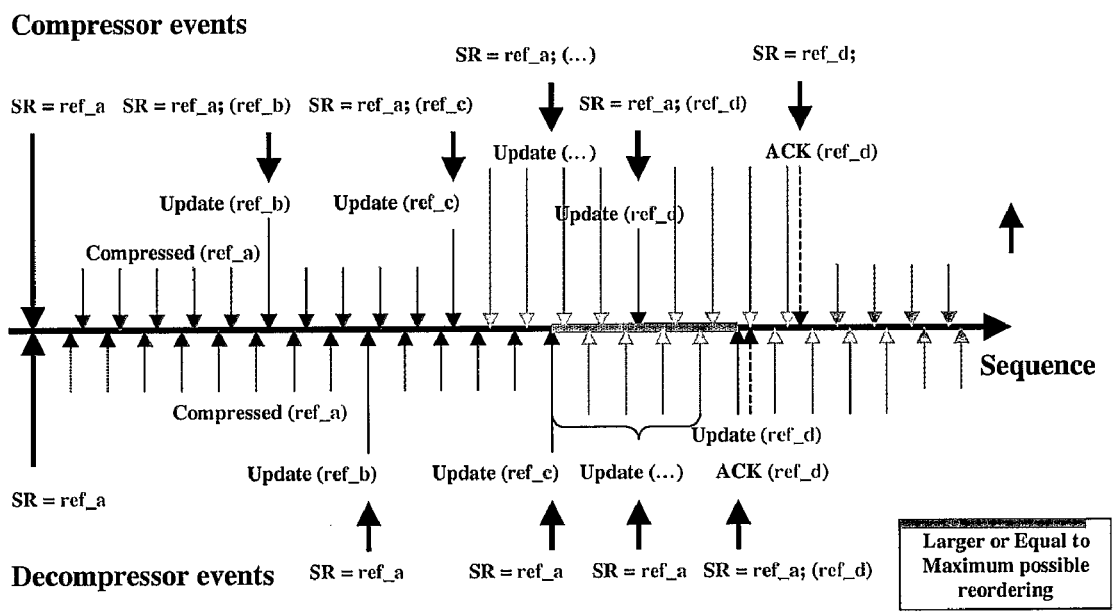
FIG. 3 illustrates updating of the Secure Reference (SR), with reordering according to the invention.

The decompressor can achieve this by delaying the sending of an acknowledgement of an updated secure reference by at least the maximum amount of delay of the possible reordering that can occur. The general idea is shown in FIG. 3.

Note that this can be used in combination with the first alternative logic. Note also that this does not require any modifications to standards.

Possible Embodiment Using ROHC

Taking the specific example of ROHC in R-mode, the R-0 and R-1* packet types each have six LSB bits in its format; the resulting size of the interpretation interval using this packet type is thus $2^6$, i.e. 64. This packets are self-contained and do not update the secure reference. The UOR-2 packet type has six, nine or 14 LSB bits in its format (with extensions); the resulting maximum size of the interpretation interval using this packet type is thus $2^{14}$, i.e. 16384.

This means that a ROHC compressor would normally send R-0 and R-1* packet type without updating the secure reference for at most 64 packets. After this, the number of LSB bits within the format of these packets is not enough anymore, and the secure reference must be updated or a different packet type with more LSB bits must be used to convey the compressed information unambiguously. Packets with more LSB bits, such as UOR-2, are context updating.

Specifically for ROHC, the idea can be summarized as follow:

"Implement the ROHC R-mode decompressor so that the R-0-CRC packet type is never acknowledged. For other context-updating packet types, delay the acknowledgements until a number of consecutive context-updating packets at least equal to the maximum possible delay due to reordering is received."

Compressor-Decompressor Logic—Selective Acknowledgements

Basic idea: The compressor sends only context-updating packets. The decompressor updates its secure reference and sends corresponding acknowledgements only for a specific type of packet.

Description: The packet types that are acknowledged is a packet that indicates that the compressor must start using an updated secure reference to be capable to resume the use of the smallest packet type; alternatively, it is a packet that updates information other than sequential information (i.e. other than SN, and other fields compressed as function of the SN such as Timestamp and IP-ID).

Specifically for ROHC, the idea can be summarized as follow:

"Implement the ROHC R-mode compressor so that the R-0 and R-1* packet types are not used (R-0-CRC can be used instead of R-0, and UOR-2 instead of R-1*). Implement the ROHC R-mode decompressor so that R-0-CRC packets are never acknowledged, and that other packets are only acknowledged when the decompressed SN value is outside the LSB (W-LSB) interpretation interval for the secure reference or if non-sequential fields need to be updated (i.e. other than SN, and other fields compressed as function of the SN such as Timestamp and IP-ID)."

Compressor-Decompressor Logic: Context Update Guard Interval

Basic idea: When it needs to update the context for a particular change, the compressor sends a number X of consecutive context-updating packets at least equal to the maximum number of possible packet reordering. The decompressor only acknowledges the first context-updating packet of a sequence (or ensures that the packet acknowledged was followed by X context-updating packets).

Description: The compressor can ensure that packets that could be reordered so that they can be decompressed erroneously, i.e. based on the wrong secure reference, can be detected at the decompressor by sending a number of consecutive context-updating packets at least equal to the maximum number of possible packet reordering; when an ACK is received for the reference where the count started it can resume sending self-contained packets. The decompressor only acknowledges the first update of the sequence (or ensures that the packet acknowledged was followed by a sufficient number of context-updating packets) and not the other packets for that sequence (these packets are safeguards against reordering).

Specifically for ROHC, the idea can be summarized as follow:

"Implement the ROHC R-mode Compressor so that the R-0 and R-1* packet types are not used for an interval at least equal to the maximum possible reordering that can occur to a packet between compressor and decompressor when performing a context update. Implement the ROHC R-mode decompressor so that the secure reference is updated and an acknowledgement is sent for the first packet meant to update a specific context parameter in a sequence of context-updating packets (or compressor ensures that the packet acknowledged was followed by a sufficient number of context-updating packets)."

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Specially, it should be noted that even if the generic terms header compression, header compressor and header decompressor are used to show that the applicability of all of the above ideas is not limited to any specific header compression scheme, although it is certainly of more relevance to [ROHC], [IP-ONLY] and [ROHC-UDPLite].

The invention claimed is:

1. A computer-implemented method for improving the use of a secure reference principle in a header compression scheme over a channel that admits reordering of packets between a compressor and a decompressor, comprising:
using a secure reference, transmitting a first plurality of non-context updating packets between a compressor and a decompressor over a channel that admits reordering of packets; and
in response to a context update, transmitting a second plurality of context-updating packets between the compressor and the decompressor over the channel, wherein a number of packets in the second plurality is greater than or equal to a maximum possible reordering that packets can experience on the channel between the compressor and the decompressor, thereby ensuring that no erroneous decompression of packets due to reordering can occur undetected when using the secure reference principle.

2. The method of claim 1, further comprising verifying the correctness of a number of non context-updating packets at least equal to a maximum possible reordering after the context update based on a transport layer checksum.

3. The method of claim 2, further comprising detecting erroneous decompression of non context-updating packets caused by reordering by using the transport layer checksum, and the transport layer checksum verification is applied to a number of non context-updating packets at least equal to the maximum possible reordering after the context has been updated and the corresponding acknowledgment has been sent.

4. The method of claim 1, wherein the decompressor ensures that a secure reference is not updated until the compressor has sent a number of context-updating packets at least equal to the maximum possible reordering that packets on the channel between compressor and decompressor can experience.

5. The method of claim 1, further comprising delaying acknowledgements for context updates with the purpose of forcing said compressor into sending context-updating packets for a number of packets at least equal to the maximum possible reordering that can occur on the channel between said compressor and said decompressor.

6. The method of claim 5, further comprising operating the decompressor in ROHC R-mode, wherein the decompressor does not acknowledge R-0-CRC, packets received and delays the acknowledgements for other context-updating packet types until a number of consecutive context-updating packets at least equal to the maximum possible delay due to reordering are received.

7. The method according to claim 1, wherein the decompressor uses self-regulating properties of the LSB and/or W-LSB encoding methods to determine when to update the secure reference.

8. The method of claim 1, wherein the compressor only sends context-updating packets and said decompressor performs selective context updating and sends corresponding acknowledgements based on particular semantics of a specific subset of context-updating packet types.

9. The method of claim 8, further comprising acknowledging only packets that indicate that the compressor must start using an updated secure reference to be capable to resume the use of the smallest packet type and packets that update information other than sequential information.

10. The method of claim 8, further comprising operating the compressor in ROHC R-mode so that the R-0 and R-1* packet types are not used; and
operating the decompressor in ROHC R-mode so that R-0-CRC packets are never acknowledged, and that other packets are only acknowledged when the decompressed SN value is outside the LSB (W-LSB) interpretation interval for the secure reference or if non-sequential fields need to be updated.

11. The method of claim 1, further comprising updating a context associated with the decompressor and sending a corresponding acknowledgement from the decompressor to the compressor only for the first context updating packet received in a sequence.

12. The method of claim 11, further comprising operating the compressor in ROHC R-mode so that the R-0 and R-1* packet types are not used for an interval at least equal to the maximum possible reordering that can occur to a packet between compressor and decompressor when performing a context update and operating the decompressor in ROHC R-mode so that the secure reference is updated and an acknowledgement is sent for the first packet meant to update a specific context parameter in a sequence of context-updating packets.

13. The method of claim 1, wherein compressor and/or said decompressor are/is implemented according to [ROHC], [IP-ONLY], [ROHC-UDPLite].

14. An arrangement for improving the use of a secure reference principle in a header compression scheme over a channel that admits reordering of packets between a compressor and a decompressor, comprising:
means for transmitting a first plurality of non-context-updating packets between a compressor and a decompressor, using a secure reference, over a channel that admits reordering of packets; and
means for transmitting a second plurality of context-updating packets between the compressor and the decompressor over the channel in response to a context update, wherein a number of packets in the second plurality is greater than or equal to a maximum possible reordering that packets can experience on the channel between the compressor and the decompressor, thereby ensuring that no erroneous decompression of packets due to reordering can occur undetected when using the secure reference principle.

15. The arrangement of claim 14, further comprising means for verifying the correctness of a number of non context-updating packets at least equal to a maximum possible reordering after the context update based on a transport layer checksum.

16. The arrangement of claim 15, further comprising means for detecting erroneous decompression of non context-updating packets caused by reordering by using the transport layer checksum, and means for applying the transport layer checksum verification to a number of non context-updating packets at least equal to the maximum possible reordering after the context has been updated and the corresponding acknowledgment has been sent.

17. The arrangement of claim 14, wherein the decompressor is configured to ensure that a secure reference is not updated until the compressor has sent a number of context-updating packets at least equal to the maximum possible reordering that packets on the channel between compressor and decompressor can experience.

18. The arrangement of claim 14, further comprising means for sending delayed acknowledgements for context updates with the purpose of forcing said compressor into sending context-updating packets for a number of packets at least equal to the maximum possible reordering that can occur on the channel between said compressor and said decompressor.

19. The arrangement of claim 14, wherein the compressor is configured for only sending context-updating packets, even when other packet types may be sent, and said decompressor is configured for performing selective context updating and for sending corresponding acknowledgements based on particular semantics of a specific subset of context-updating packet types.

20. The arrangement of claim 14, wherein the decompressor is configured for updating its context and for sending corresponding acknowledgement only for the first context updating packet received in a sequence.

* * * * *

UNITED STATES PATENT AND TRADEMARK OFFICE
CERTIFICATE OF CORRECTION

| | | |
|---|---|---|
| PATENT NO. | : 7,962,653 B2 | |
| APPLICATION NO. | : 11/568944 | |
| DATED | : June 14, 2011 | |
| INVENTOR(S) | : Jonsson et al. | |

It is certified that error appears in the above-identified patent and that said Letters Patent is hereby corrected as shown below:

On the Title Page, item (75), under "Inventors", in Column 1, Line 1, delete "Lulea" and insert -- Luleå --, therefor.

In Column 3, Line 58, delete "(VOIP)" and insert -- (VoIP) --, therefor.

In Column 8, Line 30, delete "VOIP" and insert -- VoIP --, therefor.

In Column 8, Line 36, delete "artifacts" and insert -- artefacts --, therefor.

In Column 8, Line 60, delete "artifacts" and insert -- artefacts --, therefor.

Signed and Sealed this
Third Day of January, 2012

David J. Kappos
*Director of the United States Patent and Trademark Office*